(12) United States Patent
Wang et al.

(10) Patent No.: US 9,115,933 B2
(45) Date of Patent: Aug. 25, 2015

(54) FLAME DETECTION DEVICE

(75) Inventors: Mingkun Wang, Beijing (CN); Congbin Jiang, Beijing (CN); Wei Xin, Beijing (CN); Jinjun Guo, Beijing (CN); Dong Ma, Beijing (CN)

(73) Assignee: Changzheng Engineering Co., Ltd., Beijing (CN)

( * ) Notice: Subject to any disclaimer, the term of this patent is extended or adjusted under 35 U.S.C. 154(b) by 221 days.

(21) Appl. No.: 13/520,017

(22) PCT Filed: Dec. 30, 2009

(86) PCT No.: PCT/CN2009/001599
§ 371 (c)(1),
(2), (4) Date: Oct. 3, 2012

(87) PCT Pub. No.: WO2011/079422
PCT Pub. Date: Jul. 7, 2011

(65) Prior Publication Data
US 2013/0189636 A1    Jul. 25, 2013

(51) Int. Cl.
*F27D 21/00*    (2006.01)
*F23M 11/04*    (2006.01)
(Continued)

(52) U.S. Cl.
CPC ............. *F27D 21/00* (2013.01); *F23M 11/045* (2013.01); *F23N 5/082* (2013.01); *G01J 5/0014* (2013.01);
(Continued)

(58) Field of Classification Search
CPC ............... F23N 2029/20; F23N 2900/05005; F23N 5/082; F23M 11/045; G01J 5/042; G01J 5/041; G01J 5/0014; F27D 21/04; F27D 21/00

USPC ................. 432/32; 431/13, 46; 250/554, 239; 60/39.091
See application file for complete search history.

(56) References Cited

U.S. PATENT DOCUMENTS 2,797,336 A * 6/1957 Loft ............................... 250/239
2,840,146 A * 6/1958 Ray ................................. 431/79
(Continued)

FOREIGN PATENT DOCUMENTS

CN    1186195 A    7/1998
CN    2376573 Y    5/2000
(Continued)

OTHER PUBLICATIONS

OSHA, "Hazardous (Classified) Locations", May 1996, OSHA, pp. 1-6, https://www.osha.gov/doc/outreachtraining/htmlfiles/hazloc.html.*
(Continued)

*Primary Examiner* — Steven B McAllister
*Assistant Examiner* — Steven Anderson, II
(74) *Attorney, Agent, or Firm* — Nutter McClennen & Fish LLP; David J. Powsner; Derek P. Roller

(57) ABSTRACT

The present invention is directed to a flame detection device comprising a flame signal receiver (1), a flame signal passage (11) and a flame signal transmitting mechanism, characterized in that, the flame signal passage (11) passes through a furnace shell (12) into inner of the furnace and comprises an outside-furnace passage portion (11a) and an inside-furnace passage portion (11b); wherein a pressure-resistant optical mechanism (10) is arranged at the outermost end of the outside-furnace passage portion, said pressure-resistant optical mechanism hermetically and transparently separate the flame signal receiver from the flame signal passage; and wherein the inside-furnace passage portion (11b) is provided with a cooling mechanism (19). Such a flame detection device is to be arranged on a furnace shell, and it could not only conduct a flame detection on the furnace under high temperature and high pressure, but also has a selection of the proper flame signal receivers installed for different stages of operation as desired.

14 Claims, 2 Drawing Sheets

(51) Int. Cl.
   *F23N 5/08*  (2006.01)
   *G01J 5/04*  (2006.01)
   *G01J 5/00*  (2006.01)

(52) U.S. Cl.
   CPC ............. *G01J 5/041* (2013.01); *F23N 2029/18* (2013.01); *F23N 2029/20* (2013.01); *F23N 2900/05005* (2013.01)

(56) References Cited

U.S. PATENT DOCUMENTS

| | | | | |
|---|---|---|---|---|
| 3,051,035 | A | * | 8/1962 | Root .............................. 385/117 |
| 3,241,595 | A | * | 3/1966 | Gilbert ............................ 431/23 |
| 3,476,945 | A | * | 11/1969 | Golden et al. ................. 250/554 |
| 4,970,898 | A | * | 11/1990 | Walish et al. ................... 73/706 |
| 4,981,088 | A | * | 1/1991 | Burris ........................... 110/193 |
| 6,141,957 | A | * | 11/2000 | Tsukagoshi et al. ............. 60/803 |
| 2005/0000570 | A1 | * | 1/2005 | Mohammed et al. ...... 137/487.5 |
| 2006/0243347 | A1 | * | 11/2006 | Humphrey ...................... 141/95 |
| 2010/0140373 | A1 | * | 6/2010 | Myhre et al. .................... 239/71 |

FOREIGN PATENT DOCUMENTS

| | | | |
|---|---|---|---|
| CN | 1594982 | A | 3/2005 |
| CN | 2859482 | Y | 1/2007 |
| CN | 1945124 | A | 4/2007 |
| CN | 201145751 | Y | 11/2008 |
| CN | 101398183 | A | 4/2009 |
| CN | 202329805 | * | 7/2012 |
| FR | 2615596 | A1 | 11/1988 |
| KR | 10-2004-0107669 | * | 12/2004 |

OTHER PUBLICATIONS

International Search Report mailed Aug. 26, 2010 for Application No. PCT/CN2009/001599 (8 Pages).

\* cited by examiner

FLAME DETECTION DEVICE

TECHNICAL FIELD

The present invention is directed to the field of flame detection, particularly to a flame detection device for conducting flame detection as to a high-temperature and high-pressure furnace chamber under an explosive gas atmosphere.

BACKGROUND

A typical flame detection means at present includes a flame scanner or an industrial camera. Although flame scanners have advantages of high sensitivity and automaticity, there also exit several problems of "miss report, false report and peeking" or the like due to the complexity of the flame detection. Therefore, flame detection by combining an industrial camera with a flame detector could be employed on account of different conditions. A current flame scanner mainly includes an infrared flame scanner and an ultraviolet flame scanner. The infrared flame scanner is typically applied to detecting coal flame, while the ultraviolet flame scanner is typically applied to detecting gas flame and oil flame.

Most furnace burners nowadays adopt a multi-step ignition, and during different phases of the operation, the burning substance is changed. For example, some furnace burners ignite fuel gas or fuel oil and next boost pressure, and then introduce coal for normal operation. Since the characters of radiation spectrums of flames generated by burning different fuel are different, a single infrared or ultraviolet flame scanner cannot meet the requirements of flame detection as to the different operation phases of the burners. Typically, a solution to this problem is to install the infrared and ultraviolet flame scanners simultaneously. However, this will need a very large space to receive a plurality of flame detectors as well as their accessorial lines and conduits, which is rather difficult for those compact furnaces to provide such large spaces.

In addition, the currently used flame scanners and industrial cameras require relatively strict working environments on temperature and pressure. They typically require that the working temperature is below 70° C. and the working pressure is atmosphere or micro negative pressure, otherwise, failure of or damaged to the flame scanner occurs when going beyond above working environments. However, the current flame scanners have to directly face the gas environment inside the furnace chamber. For those high furnace temperature and pressure furnaces, in which the temperature could reach above 1000° C. and the furnace pressure would reach a magnitude of several MPa, the current flame scanners cannot meet the operation requirements under such a high temperature and pressure.

A flame detecting probe is disclosed in Chinese patent publication CN101398183A, which comprises a phototube, an anti-explosion junction cassette, a quartz glass sheet located between a cover for a phototube protecting sleeve and the phototube protecting sleeve, and a cooling venting passage for cooling the phototube and the quartz glass sheet. Such a flame detector probe is mounted inside the furnace chamber. Although the phototube is separated from the high temperature environment inside the furnace via the quartz glass sheet and the cooling venting passage is provided for cooling the phototube, the quartz glass sheet contacts directly with the environment inside the furnace such that the quartz glass sheet and thus the phototube is prone to be damaged by high temperature. Moreover, the furnace has to be shut down when such a flame detector probe is to be replaced.

SUMMARY OF THE INVENTION

The primary object of the present invention is to overcome the defects in the prior arts and to provide a flame detection device which is able to conduct flame detection as to a high temperature and pressure furnace and has a relatively long service life.

For the reason above, the present invention provides a flame detection device comprising a flame signal receiver, a flame signal passage and a flame signal transmitting mechanism; wherein the flame signal passage passes into an inner of a furnace through a furnace shell and comprises an outside-furnace passage portion and an inside-furnace passage portion; and wherein a pressure-resistant optical mechanism is arranged at an outermost end of the outside-furnace passage portion, said pressure-resistant optical mechanism hermetically and transparently separates the flame signal receiver from the flame signal passage.

Preferably, the inside-furnace passage portion comprises a cooling mechanism, which not only plays a role in preventing the inside-furnace passage portion from being damaged by the high temperature, but also could decrease the temperature of high-temperature gas which is from inner of the furnace before it gets into the outside-furnace passage portion of the flame signal passage such that the gas contacting with the pressure-resistant optical mechanism has a temperature lower than that inside the furnace, so as to increase the service life of the pressure-resistant optical mechanism. In the present invention, the cooling mechanism is configured to have a structure of multi-layer jacket or coil pipes which is provided with a coolant inlet and a coolant outlet. It should be appreciated that the cooling mechanism could be any suitable structure and the coolant may include water, gas or any other suitable fluid.

According to one aspect of the present invention, it is preferred that a protective gas inlet is provided on one side of the outside-furnace passage portion for introducing protective gas, such as inert gas, into said outside-furnace passage portion in order to further lower the temperature of the gas from the inside-furnace passage portion, so as to prevent the pressure-resistant optical mechanism from coming into exposedly contact with the high-temperature gas and thus to maintain a relative low temperature of the surface of the optical mechanism and to protect the surface from corrosion by the gas.

In order to improve the safety of the flame detection device and facilitate servicing and replacing the flame signal detector, a valve mechanism is also arranged between the pressure-resistant optical mechanism and the outside-furnace passage portion, which can be configured, upon opening, together with the flame signal passage and the pressure-resistant optical mechanism, to form a light passage through which the light is able to pass. It is preferred that the valve mechanism is a ball valve in the present invention, however, it is appreciated for those skilled in the art that any suitable valve mechanism which allows flame signals to pass through upon opening could be adopted. According to a preferred aspect of the present invention, the valve mechanism includes a pneumatic ball valve and a manually operated ball valve connected to the pneumatic ball valve. Furthermore, such a valve mechanism should guarantee that light can pass through when it opens and it can be rapidly closed or opened. Furthermore, it should also guarantee that the furnace chamber under the high temperature and pressure is sealed upon closing. Said valve mechanism should also endure the temperature and pressure involved.

Furthermore, in order to improve the safety of the flame detection device, it is preferred that a pressure-resistant protective enclosure which hermetically connects to the pressure-resistant optical mechanism is arranged outside of the flame signal receiver. In the event of damage to the pressure-resistant optical mechanism by accident, the pressure-resistant protective enclosure would keep the high-temperature gas, which is bursting out of the furnace chamber, from escaping out of the enclosure in order to gain time for further measures. It should be understood herein that the pressure-resistant protective enclosure could be any suitable protection mechanism as well known to those skilled in the art.

According to an aspect of the present invention, the flame signal receiver detachablely connects with the pressure-resistant optical mechanism by a joint, and the flame signal transmitting mechanism comprises a signal wire connected to the flame signal receiver and extending from an electric connector which is arranged on the pressure-resistant protective enclosure and is preferably capable of enduring high temperature and pressure. A flameproof enclosure which hermetically connects to the pressure-resistant protective enclosure is arranged on the outside of the electric connector, such that the flame detection device can be operated in an explosive gas atmosphere. Said flameproof enclosure can isolate the electric components from the external explosive gas atmosphere, such that the flame detection device can be used safely in the flammable and explosive gas environment, such as in a chemical plant or the like. It is appreciated for the person skilled in the art that both the electric connectors and the flameproof enclosures are well-known components in the art.

In the aspect, the electric connector can be configured as a plug-in structure having a male connector member and a female connector member. The signal wire extending from the flame signal receiver is attached to the female member on the inside of the pressure-resistant protective enclosure. The male connector member at one end is inserted in the female member and at the other end a cable is connected. The cable transmits electrical signals to a control system. The flameproof enclosure isolates the electric connector from the external explosive atmosphere, such that the electric sparks generated by the electric connector is prevented from igniting the external potentially explosive gas. It is further preferred that the combination of the pressure-resistant protective enclosure and the flameproof enclosure also could isolate the flame signal receiver from the external explosive gas atmosphere so as to prevent the electric sparks generated by the flame signal receiver from igniting the flammable and explosive gas in the external environment.

In an aspect of the present invention, the pressure-resistant optical mechanism includes a mounting flange, a compressing flange, and a transparent member and a sealing member which are arranged between the mounting flange and the compressing flange, such that the pressure-resistant optical mechanism is capable of hermetically and transparently separating the flame signal receiver from the flame signal passage. In this embodiment, the transparent member for example can be a quartz lens. It should be understood that, however, any kind of transparent material which has a certain level of resistance to heat and pressure can be used.

In addition, in the present invention, the flame signal receiver can be selected from one in the following group: an infrared/ultraviolet dual sensor flame scanner, an infrared flame scanner, an ultraviolet flame scanner or an industrial camera. Since such a flame detection device is arranged outside the high temperature and pressure environment in the furnace, the flame signal receiver can be easily detached without shutting down the furnace. Therefore, different flame signal receivers, such as the infrared/ultraviolet dual sensor flame scanner which can meet various detection requirements for combustion flames of different burning substances, such as coal-flame, gas-flame, oil-flame or the like, can be selected depending on the specific flame in the furnace. With respect to the burners employing a multi-step ignition, one such flame detection device can fulfill the detection task, such that the space for arranging the flame detection devices and the cost can be decreased.

The flame detection device according to the present invention is capable of conducting flame detection on a high temperature and pressure furnace chamber under an explosive gas atmosphere. Since such a flame detector is mounted outside the furnace, it also allows to select and to install an appropriate kind of flame detectors or industrial cameras depending on the specific conditions, so as to fulfill various flame detection requirements. Moreover, the flame signal receiver of such a flame detection device would not contact directly with the high temperature and pressure gas, thereby greatly increasing the service life and adaptability thereof.

BRIEF DESCRIPTION OF THE DRAWINGS

The present invention would be explained in detail in the following description in conjunction with the attached drawings, in which the same reference number represents the same components, wherein.

REFERENCE NUMERALS LIST

1—flame signal receiver
2—joint
3—compressing flange for transparent member
4—transparent member
5—packing
6—gasket
7—spacer
8—mounting flange
9—valve mechanism
9a—pneumatic ball valve
9b—manually operated ball valve
10—pressure-resistant optical mechanism
11—flame signal passage
11a—the outside-furnace passage portion
11b—the inside-furnace passage portion
12—furnace shell
14—pressure-resistant protective enclosure
15—electric connector
16—flameproof enclosure
17—cable
17a—signal wire
18—protective gas inlet
19—cooling mechanism
19a—coolant inlet
19b—coolant outlet

DETAILED DESCRIPTION OF THE PREFERRED EMBODIMENT

Figure 1:
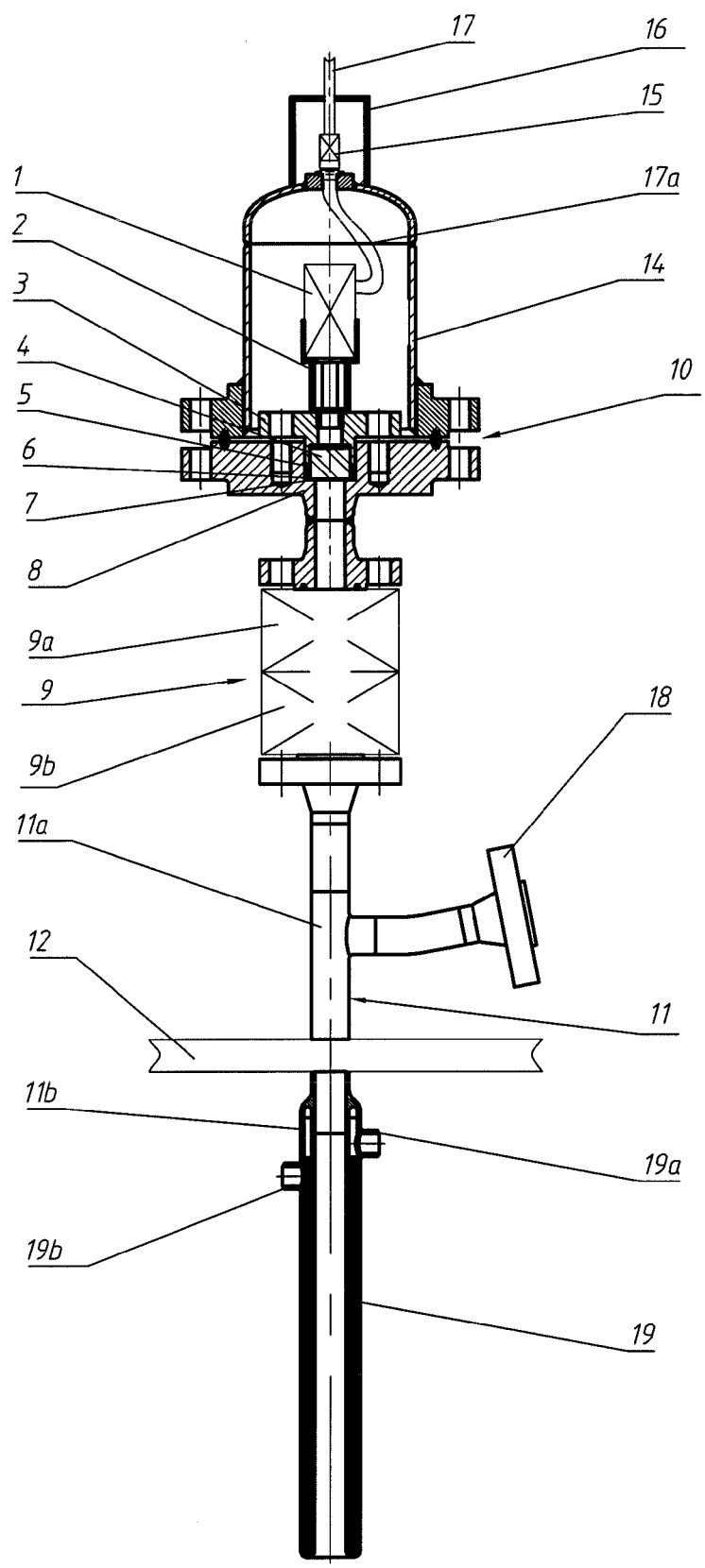
FIG. 1 is a cross-sectional view of one embodiment of the flame detection device according to the present invention.

FIG. 1 shows an embodiment of the flame detection device according to the present invention which comprises a flame signal receiver 1, a pressure-resistant optical mechanism 10 and a flame signal passage 11. The pressure-resistant optical mechanism 10 includes a transparent member 4, a mounting flange 8 and a compressing flange 3. The transparent member 4 is placed into the mounting hole of the mounting flange 8 with spacers 7 being positioned on its upside and downside. A gasket 6 surrounding the transparent member 4 is also positioned in the mounting hole, and is filled with packing 5 (i.e., a temperature-resistant sealing member). In this embodiment, the compressing flange 3 and the mounting flange 8 is connected with each other, e.g., via bolts or the like, thereby sealing the pressure-resistant optical mechanism 10 by tightening the compressing flange 3 to jam the packing 5.

In this embodiment, the flame signal receiver 1 is mounted on joint 2, which is in turn mounted on the compressing flange 3, and the mounting flange 8 finally attaches to a valve mechanism 9 via an adapter flange. Herein, the valve mechanism 9 preferably includes a pneumatic ball valve 9a which is attached to the pressure-resistant optical mechanism 10, and a manually operated ball valve 9b which is attached to an outside-furnace passage portion 11a of the flame signal passage 11 positioned on the furnace shell 12. An inside-furnace passage portion 11b of the flame signal passage 11 is positioned inside the furnace wall of the furnace shell 12. It should be understood for those skilled in the art that, although the valve mechanism 9 is a ball valve in this embodiment, other types of valve mechanisms could be adopted as long as the valve mechanism on one hand allows the flame signals to pass through when it opens, and on the other hand it can be rapidly closed or opened if necessary, and also ensures that the high temperature and pressure furnace chamber is isolated when said valve mechanism closes meanwhile can endure working temperature and pressure involved.

It is advantageous that the inside-furnace passage portion 11b further comprises a cooling mechanism 19 having a coolant inlet 19a and a coolant outlet 19b. In the present invention, the cooling mechanism 19 can be configured to have a structure of multi-layer jacket or coil pipes or any other suitable structure. In this embodiment, the coolant in cooling mechanism 19 is water. However, it could be appreciated for the person skilled in the art that, any suitable coolant, such as air, may provide a desired cooling effect, can also be used. The inside-furnace passage portion 11b of the flame signal passage and the cooling mechanism herein can be made of a material that is resistant to the high temperature and corrosion. Such a cooling mechanism for cooling the inside-furnace passage portion not only prevents the inside-furnace passage portion from being damaged by the high temperature, but also decreases the temperature of high-temperature gas inside the furnace before the gas gets into the outside-furnace passage portion of the flame signal passage, such that gas contacts with the pressure-resistant optical mechanism in a lower temperature than that inside the furnace. As a result, the service life of the pressure-resistant optical mechanism is increased.

Preferably, in this embodiment a protective gas inlet 18 is positioned outside the passage portion 11a, through which protective gas, such as inert gas, is fed into said outside-furnace passage portion 11a in order to further cool down the high temperature gas from the inside-furnace passage portion and thus to prevent the transparent member 4 from contacting with the high temperature gas directly, such that the pressure-resistant optical mechanism 10 keeps at a relative lower temperature and is prevented from corrosion caused by gas as well. To achieve the effect of isolating the high temperature gas, the protective gas should be fed continuously. When feeding the protective gas, the flow rate and pressure of the protective gas should be controlled such that a portion of the protective gas is allowed to get into the furnace. In this case, the composition and flow rate of the protective gas on one hand should meet the requirements of protection, but on the other hand would have no obvious impact on normal reactions and the composition of the gas within the furnace. For example, the protective gas can be carbon dioxide or nitrogen depending on the products to be prepared. In this embodiment, the transparent member 4 is made from quartz glass which is not prone to be corroded by the gas. The primary function of the protective gas is to obstruct the high temperature gas from the furnace chamber. However, if other transparent materials are used, the protective gas also could advantageously protect them from corrosion.

In order to improve the safety of the flame detection device, a pressure-resistant protective enclosure 14, which is hermetically connected to the mounting flange 8 for fixing the transparent member 4, is arranged outside of the flame signal receiver 1. In the event of transparent member 4 broken by an accident, the pressure-resistant protective enclosure 14 would hold the high-temperature gas which is bursting out of the furnace chamber, and avert the high-temperature gas escaping out of the enclosure in order to gain time for taking further measures. It should be understood for the person skilled in the art that the pressure-resistant protective enclosure could be any other suitable protection mechanism.

In this embodiment, a signal wire 17a from the flame signal receiver 1 is led out the pressure-resistant protective enclosure 14 via an electric connector 15. Herein, the electric connector 15 is configured as a plug-in structure having a male member and a female member. The signal wire 17a from the flame signal receiver 1 is attached to the female member on the inside of the pressure-resistant protective enclosure 14, the male connector member at one end is inserted in the female member and at the other end a cable 17 is led out for transmitting electric signals to the control system. For the operation of flame detection device in an explosive gas atmosphere, a flameproof enclosure 16 is arranged outside and encloses the electric connector 15. The flameproof enclosure is fixedly attached to the outer wall of the pressure-resistant protective enclosure 14, e.g. by means of welding or the like, and the cable 17 extends from the top of the flameproof enclosure 16. Moreover, the combination of the pressure-resistant protective enclosure 14 and the flameproof enclosure 16 also could isolate the flame signal receiver 1 from the external explosive gas atmosphere so as to prevent the electric sparks potentially generated by the flame signal receiver 1 from igniting the flammable and explosive gas in the external environment.

In addition, since the flame detection device in the present invention is arranged outside the furnace, this facilitates the detachment and replacement of the flame signal receiver 1. In this embodiment, the flame signal receiver 1 is an infrared/ultraviolet dual sensor flame scanner so as to meet the detection requirements for different burning substance, such as coal-flame, gas-flame, oil-flame or the like. With respect to burners employing the manner of multi-step ignition, one such flame detection device can fulfill the detecting task, which will save the space for receiving the flame detection devices and thus cut down the cost. However, depending on the specific applications, it is possible to select any of one from the following group: an infrared/ultraviolet dual sensor flame scanner, an infrared flame scanner, an ultraviolet flame scanner or an industrial camera The operation of the flame detection device of the present invention will be described in detail as follows: during the running of the boiler or gasifier, if there is a need to conduct a flame detection, an operator will open the pneumatic ball valve 9a and the manually operated ball valve 9b in sequence, and start the working of the cooling mechanism 19; wherein a cooling water is supplied through the coolant inlet 19a, and outflows from the coolant outlet 19b to provide cooling protection for the inside-furnace passage portion 11b of the flame signal passage 11. Meanwhile, an inert gas through the protective gas inlet 18 is introduced to provide protection for the pressure-resistant optical mechanism 10, particularly for the transparent member 4. The flame radiation signals in the furnace chamber received by the inside-furnace passage portion 11b of the flame signal passage 11 pass through the inside-furnace flame passage portion 11b, the outside-furnace flame passage portion 11a, the manually operated ball valve 9b and the pneumatic ball valve 9a as well as the transparent member 4 in sequence and then are received by the flame signal receiver 1. After processed by the flame signal receiver 1, the received flame radiation signals are transmitted out of the pressure-resistant protective enclosure 14 by the signal wire 17a and the electric connector 15 and then to a post-processing system or safety system via the cable 17 extending through the flameproof enclosure 16. When the boiler runs stably or stops, the manually operated ball valve 9b and the pneumatic ball valve 9a are closed in sequence.

Figure 2:
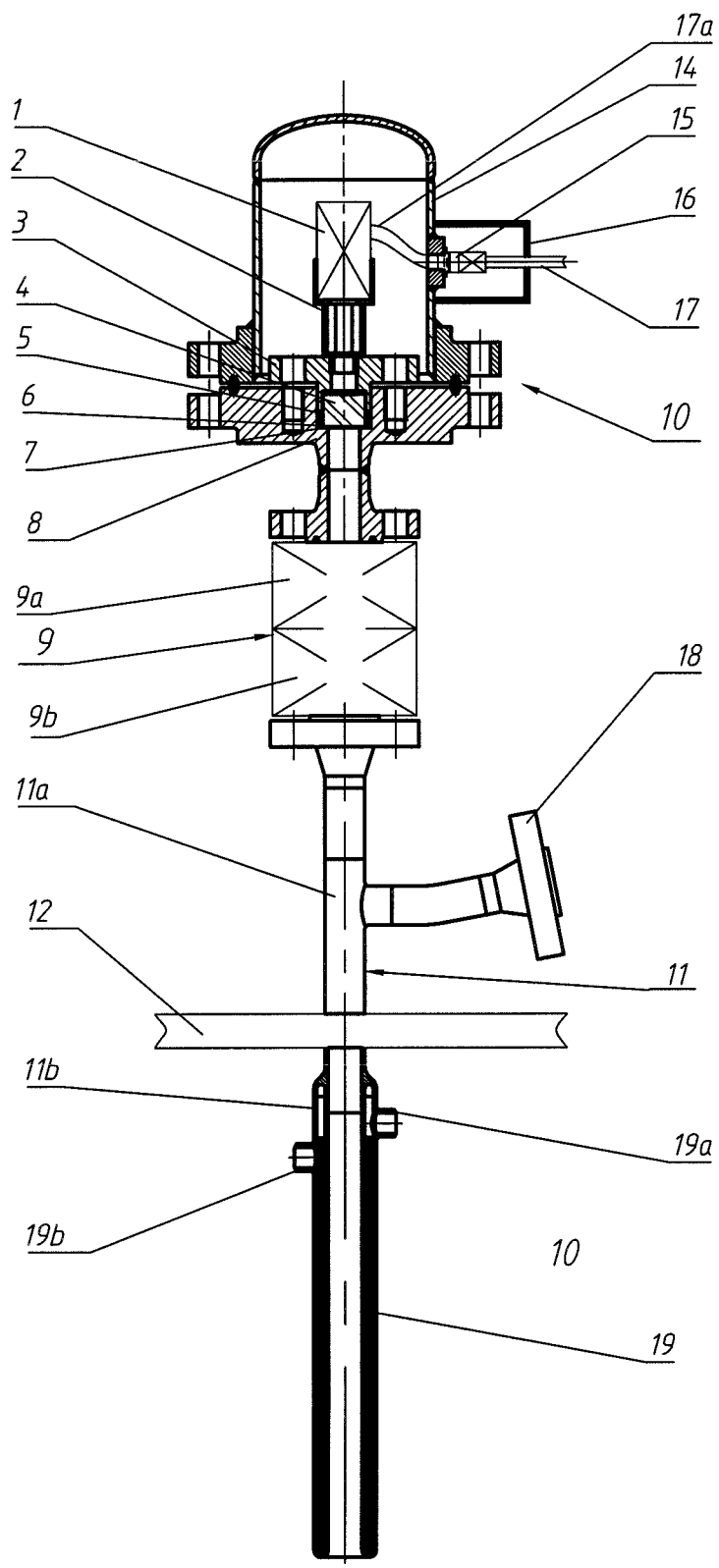
FIG. 2 is a cross-sectional view of another embodiment of the flame detection device according to the present invention.

FIG. 2 illustrates another embodiment of the flame detection device, the main structure of which is same as that of the preceding embodiment except that the electric connector 15 and the flameproof enclosure 16 are arranged on a side of the pressure-resistant protective enclosure 14.

In the flame detection device mentioned above, if there is a damage to the transparent member 4 by accident, which will cause a leakage of the high temperature and pressure gas, the sealing system formed of the pressure-resistant protective enclosure 14 and the electric connector 15 will restrict the high temperature and pressure gas from the furnace chamber within the pressure-resistant protective enclosure 14. At this moment, there need to emergently close the pneumatic valve 9a for following emergency measures. Furthermore, the two combined valves make it possible that the valves could be closed rapidly when flame detection is finished or other critical situations occur, so as to improve safety of the entire device. In addition, the use of the high temperature- and pressure-resistant electric connector and the flameproof enclosure isolates the electrical components from the external explosive gas atmosphere, which enables the flame detection device to be used in the flammable and explosive gas environment such as in chemical plants or the like.

The present invention has been generalized and described in detail via embodiments. It should be understood for those skilled in the art that the present invention is not limited to these exemplary embodiments. There would be various alterations and modifications made within the spirit and scope of the present invention as defined by the claims or any equivalents thereof.

What is claimed is:

1. A flame detection device for a furnace, comprising a flame signal receiver, a flame signal passage and a flame signal transmitting mechanism, wherein, the flame signal passage passes into an inner portion of the furnace through a furnace shell and comprises an outside-furnace passage portion and an inside-furnace passage portion; wherein a pressure-resistant optical mechanism is configured to be directly or indirectly connected to an outermost end of the outside-furnace passage portion on one side thereof and to the flame signal receiver on the other side, so as to transparently separate the flame signal receiver from the flame signal passage and thus prevent a gas within the furnace from affecting the flame signal receiver;

the pressure-resistant optical mechanism including a mounting flange having a planar mounting surface with a recess and a passage formed therein, a compressing flange having a passage formed therein, the compressing flange being seated on the mounting surface surrounding the recess and being coupled to the mounting surface via a plurality of bolts that are received in through-holes formed in the compressing flange, a transparent member received within the recess and arranged between the mounting flange passage and the compressing flange passage, and a temperature-resistant sealing member surrounding the transparent member such that tightening of said bolts compresses the temperature-resistant sealing member; and a pressure-resistant protective enclosure that is seated on the mounting surface and that includes a plurality of bolt holes formed therein for sealingly coupling to the mounting flange and that is arranged such that the pressure-resistant protective enclosure envelops the compressing flange and the flame signal receiver;

wherein the inside-furnace passage portion is provided with a cooling mechanism.

2. The flame detection device according to claim 1, wherein, the outside-furnace passage portion is provided with a protective gas inlet on one side thereof.

3. The flame detection device according to claim 1, wherein, the device further comprises a valve mechanism arranged between the pressure-resistant optical mechanism and the outside-furnace passage portion, wherein the valve mechanism is configured, upon opening, together with the flame signal passage and the pressure-resistant optical mechanism, to form a light passage.

4. The flame detection device according to claim 3, wherein, the valve mechanism is a ball valve mechanism which includes a pneumatic ball valve and a manually operated ball valve arranged in series.

5. The flame detection device according to claim 1, wherein, the flame signal receiver is detachably connected to the pressure-resistant optical mechanism via a mounting member, and wherein the flame signal transmitting mechanism includes a signal wire connected to the flame signal receiver, wherein the signal wire is led out of the pressure-resistant protective enclosure via an electric connector that is arranged on the pressure-resistant protective enclosure.

6. The flame detection device according to claim 5, further comprising a flameproof enclosure which is sealingly coupled to the pressure-resistant protective enclosure, wherein the flameproof enclosure is configured to envelope the electric connector in an anti-explosion manner.

7. The flame detection device according to claim 1, wherein, the flame signal receiver is selected from any of one in the following group: an infrared/ultraviolet dual sensor flame scanner, an infrared flame scanner, an ultraviolet flame scanner or an industrial camera.

8. The flame detection device according to claim 1, wherein, the cooling mechanism is configured to have a structure of multi-layer jacket or coil pipes.

9. The flame detection device according to claim 2, wherein, the device further comprises a valve mechanism arranged between the pressure-resistant optical mechanism and the outside-furnace passage portion, wherein the valve mechanism is configured, upon opening, together with the flame signal passage and the pressure-resistant optical mechanism, to form a light passage.

10. The flame detection device according to claim 2, wherein, the flame signal receiver is selected from any of one in the following group: an infrared/ultraviolet dual sensor flame scanner, an infrared flame scanner, an ultraviolet flame scanner or an industrial camera.

11. The flame detection device according to claim 2, wherein, the cooling mechanism is configured to have a structure of multi-layer jacket or coil pipes.

12. The flame detection device according to claim 1, wherein the pressure-resistant optical mechanism includes at least one spacer positioned on an upper side and/or lower side of the transparent member.

13. The flame detection device according to claim 1, wherein the pressure-resistant optical mechanism includes at least one spacer positioned on an upper side and/or lower side of the transparent member.

14. The flame detection device according to claim 1, wherein the flame signal receiver is detachable or replaceable during normal operation of the furnace.

* * * * *